(12) United States Patent
Lu et al.

(10) Patent No.: US 11,308,254 B2
(45) Date of Patent: Apr. 19, 2022

(54) METHOD AND SYSTEM FOR REDUCING LAYOUT DISTORTION DUE TO EXPOSURE NON-UNIFORMITY

(71) Applicant: TAIWAN SEMICONDUCTOR MANUFACTURING COMPANY LTD., Hsinchu (TW)

(72) Inventors: Chi-Ta Lu, Yilan County (TW); Chia-Hui Liao, Hsinchu (TW); Yihung Lin, Hsinchu County (TW); Chi-Ming Tsai, Taipei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/937,398

(22) Filed: Jul. 23, 2020

(65) Prior Publication Data
US 2021/0064808 A1   Mar. 4, 2021

Related U.S. Application Data

(60) Provisional application No. 62/894,466, filed on Aug. 30, 2019.

(51) Int. Cl.
*G06F 30/30* (2020.01)
*G06F 30/392* (2020.01)
(Continued)

(52) U.S. Cl.
CPC .......... *G06F 30/392* (2020.01); *G06F 30/398* (2020.01); *G06F 2111/20* (2020.01)

(58) Field of Classification Search
CPC .... G06F 2119/18; G06F 30/39; G06F 30/367; G06F 30/398; G06F 30/20; G06F 30/00; G06F 30/327; G06F 2111/20; G06F 30/392; G06F 7/5443; G03F 7/70433; G03F 7/70441; G03F 7/70283; G03F 1/36; G03F 1/70; G03F 7/0002; G03F 7/705; G03F 1/00; G03F 7/2037; G03F 7/70091; G03F 1/32; G03F 1/20; G03F 7/203; G03F 7/70125; G03F 1/30; G03F 7/2059; G03F 1/22; G03F 1/24; G03F 1/29; G03F 1/38; G03F 1/50; G03F 1/68; G03F 1/82; G03F 7/2061; G03F 7/2063; G03F 7/701; G03F 7/70108; G03F 7/70133; G03F 7/70325; G03F 7/70483; G03F 7/70625;
(Continued)

(56) References Cited

U.S. PATENT DOCUMENTS 8,762,900 B2   6/2014   Shin et al.
8,796,666 B1   8/2014   Huang et al.
(Continued)

*Primary Examiner* — Binh C Tat
(74) *Attorney, Agent, or Firm* — WPAT, P.C., Intellectual Property Attorneys; Anthony King

(57) ABSTRACT

A method, a non-transitory computer-readable storage medium and a system for adjusting a design layout are provided. The method includes: receiving a design layout including a feature in a peripheral region of the design layout; determining a first compensation value associated with the peripheral region according to an exposure distribution in an exposure field of a workpiece; and adjusting the design layout by modifying a shape of the feature according to the compensation value.

20 Claims, 10 Drawing Sheets

(51) Int. Cl.
*G06F 30/398* (2020.01)
*G06F 111/20* (2020.01)

(58) Field of Classification Search
CPC ............. G03F 7/70633; G03F 7/70666; G03F 7/7085; G03F 7/70941; G03F 9/00; G03F 9/70; G03F 7/7045; G03F 7/70516; H01L 27/0207; H01L 23/528; H01L 21/28123; H01L 21/823425; H01L 21/823437; H01L 29/6659; H01L 21/682; H01L 23/5386; H01L 23/5226; H01L 27/11803; H01L 2027/11874
USPC .................................................. 716/118–125
See application file for complete search history.

(56) References Cited

U.S. PATENT DOCUMENTS

| | | |
|---|---|---|
| 8,812,999 B2 | 8/2014 | Liu et al. |
| 8,850,366 B2 | 9/2014 | Liu et al. |
| 8,906,595 B2 | 12/2014 | Liu et al. |
| 8,954,899 B2 | 2/2015 | Wu et al. |
| 9,093,530 B2 | 4/2015 | Huang et al. |
| 9,367,655 B2 | 6/2016 | Shih et al. |
| 9,390,217 B2 | 7/2016 | Wang et al. |
| 9,548,303 B2 | 1/2017 | Lee et al. |
| 2011/0278679 A1* | 11/2011 | Tabata ..................... G03F 1/36 257/390 |
| 2017/0147734 A1* | 5/2017 | Rosenbluth ............. G03F 7/705 |
| 2019/0163048 A1* | 5/2019 | Choi ........................ G03F 1/70 |

* cited by examiner

METHOD AND SYSTEM FOR REDUCING LAYOUT DISTORTION DUE TO EXPOSURE NON-UNIFORMITY

PRIORITY CLAIM AND CROSS-REFERENCE

This application claims priority to U.S. Provisional Application No. 62/894,466 filed Aug. 30, 2019, the disclosure of which is hereby incorporated by reference in its entirety.

BACKGROUND

In advanced semiconductor technologies, the continuing reduction in device size and increasingly complex circuit arrangements have made the design and fabrication of integrated circuits (ICs) more challenging and costly. To pursue better device performance with smaller footprint and lower power consumption, advanced lithography technologies, e.g., extreme ultraviolet (EUV) lithography, have been investigated as approaches to manufacturing semiconductor devices with a line width of 30 nm or less. EUV lithography employs a mask to control the irradiation of a substrate under EUV radiation so as to form a pattern on the substrate.

While existing lithography techniques have improved, they still fail to meet requirements in many aspects. For example, the quality of radiation beams used in EUV lithography and controlled via the mask needs to be improved.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
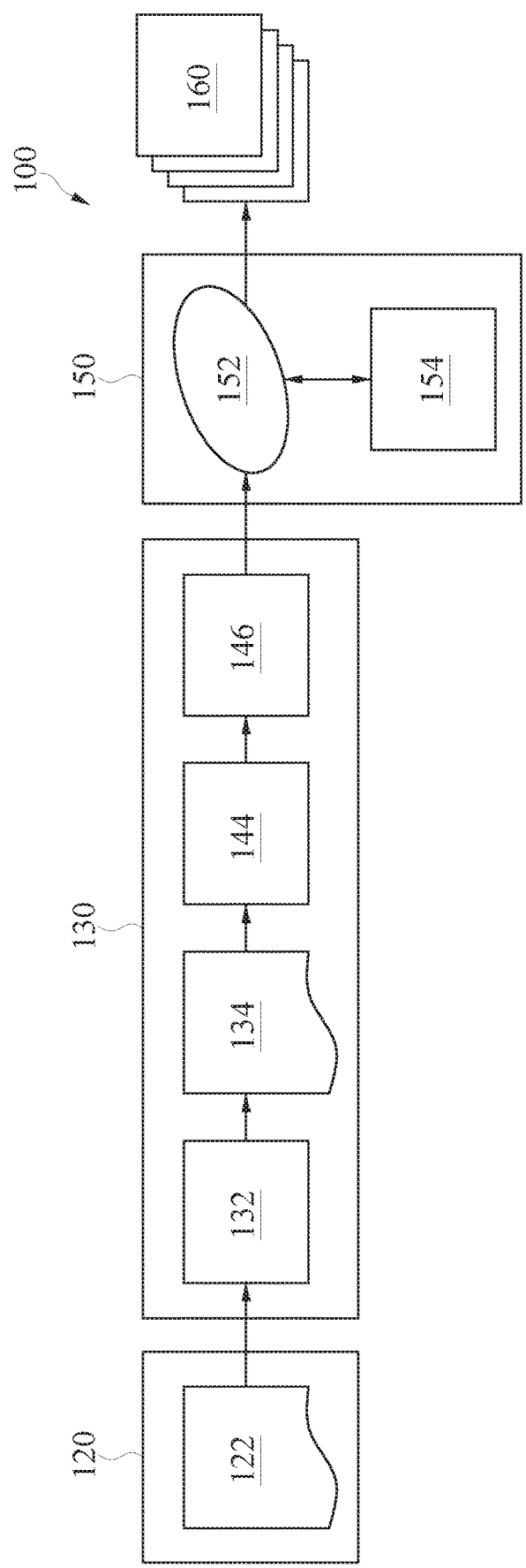
FIG. 1 is a schematic diagram showing an integrated circuit (IC) manufacturing system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

The advanced lithography process, method, and materials described in the current disclosure can be used in many applications, including fin-type field effect transistors (FinFETs). For example, the fins may be patterned to produce a relatively close spacing between features, for which the above disclosure is well suited. In addition, spacers used in forming fins of FinFETs can be processed according to the above disclosure.

As will be appreciated by one skilled in the art, the embodiments of the present disclosure may be implemented as a system, method, or computer program product. Accordingly, the embodiments of the present disclosure may take the form of an embodiment comprised entirely of hardware, an embodiment comprised entirely of software (including firmware, resident software, micro-code, etc.) or an embodiment combining software and hardware aspects. The various types of embodiments mentioned may all generally be referred to herein as a "circuit," "block," "module" or "system." Furthermore, the embodiments of the present disclosure may take the form of a computer program embodied in any tangible medium of expression having program codes embodied in the medium and executable by a computer.

The terms "reticle," "photomask" and "mask" used throughout the present disclosure refer to a device used in a lithography operation, in which an opaque image according to a circuit pattern is formed on a substrate plate. The substrate plate may be transparent. The image of the circuit pattern on the reticle is transferred to a substrate or a wafer through a radiation source of the lithography operation. Radiation from the radiation source may be incident on the substrate via the reticle in a transmissive or reflective manner.

The terms "layout," "design layout" and "mask layout" used throughout the present disclosure refer to a representation of an integrated circuit (IC) in terms of geometric patterns which correspond to the features of the IC, such as a metal layer, a dielectric layer, or a semiconductor layer, that make up the components of the IC. In some examples, the terms "layout," "design layout" and "mask layout" refer to a data file including machine-readable codes or text strings that can be converted into the geometric patterns. Additional information, such as parameters extracted from the geometric patterns, in relation to the IC may be included in the layout or design layout for enhancing the design and manufacturing processes of the IC.

The term "exposure field" or simply "field" used throughout the present disclosure refers to an exposure area defined in a workpiece, such as a semiconductor wafer, in a photolithography (or simply lithography) operation. The fields may be arranged in an array and separated by partitioning regions, e.g., scribe lines. During a lithography operation, a predetermined circuit pattern is formed on a material layer of the workpiece by a patterning operation that includes transferring a master copy of the circuit pattern fabricated on a mask to the workpiece. The transferring of the circuit pattern is usually conducted by causing a patterned radiation beam, which follows the geometry of the circuit pattern of the mask, to irradiate the exposure fields in succession. The circuit pattern of the mask may be duplicated in each of the exposure fields.

The present disclosure relates generally to the subject of semiconductor devices, and relates more particularly to a layout enhancement method for lithography enhancement under extreme ultraviolet (EUV) radiation. Lithography enhancement is employed for modifying patterns of a design layout such that the enhanced design layout takes into account the process factors, such as the optical effects, of the lithography operations. Moreover, the task of the lithography enhancement is more complicated for EUV lithography (EUVL) because processing factors, such as uniformity and leakage of the EUV radiation, on the exposure performance is more pronounced in EUVL than in other exposure methods that utilize greater wavelengths. Therefore, it is crucial to improve the performance of the EUVL operation.

The EUV radiation beam, after being patterned via reflection from the mask, is radiated onto the workpiece for patterning a material layer on the workpiece. The mask is generally formed of a patterned light-reflective layer configured to reflect the EUV radiation onto the workpiece. The mask is operated while covered by a pellicle to protect the mask from contamination. The pellicle is made substantially transparent to the EUV radiation; however, a very small amount of the EUV radiation is reflected by the pellicle. As a result, the pellicle-reflected UV radiation leads to leakage of the EUV radiation across adjacent exposure fields, causing exposure non-uniformity on the workpiece, especially at a boundary region and a corner region of the exposure field. For example, the double-exposure effect around a field side or quadruple-exposure effect at a corner of the exposure field may cause excess exposure in such regions during EUVL and result in pattern fidelity loss.

In the present disclosure, a layout adjustment technique is proposed to compensate for the non-uniformity effect of the EUV lithography operation on the workpiece, e.g., a semiconductor wafer. After the design layout is ready to be applied during the preparation of the mask, the patterns of the design layout are further modified by the layout adjustment operation in order to compensate for various effects with a goal of forming the pattern on the workpiece as close to the pattern in the design layout as possible. Specifically, the patterns or portions within a pattern are processed differently depending upon their positions in a field. The proposed layout adjustment operation provides uniform lithography performance across both the central region and the boundary region of the field. The production yield rate is increased accordingly and the time and cost spent resolving differences between the patterns of the design layout and those of the manufactured circuit are also reduced.

FIG. 1 is a schematic diagram showing an IC (integrated circuit) manufacturing system 100 in accordance with some embodiments. The IC manufacturing system 100 is configured to manufacture an IC device 160 through a plurality of entities, such as a design house 120, a mask house 130, and an IC manufacturer (fab or foundry) 150. The entities in the IC manufacturing system 100 are linked by a communication channel, e.g., a wired or wireless channel, and interact with one another through a network, e.g., an intranet or the internet. In an embodiment, the design house 120, mask house 130 and IC manufacturer 150 belong to a single entity, or are operated by independent parties.

The design house (or design team) 120 generates a design layout 122 in an IC design phase for the IC devices 160 to be fabricated. The design layout 122 includes descriptions of various geometrical patterns designed for performing specific functions that conform to the performance and manufacturing specifications. The geometrical patterns represent circuit features in the fabricated IC devices 160, e.g., metal layers, dielectric layers, or semiconductor layers, that form various IC components, such as an active region, a gate electrode, a source region or a drain region, and a conductive line or via of an interconnect structure (sometimes referred to as a redistribution layer). In an embodiment, the design house 120 operates a circuit design procedure to generate the design layout 122. The circuit design procedure may include, but is not limited to, logic design, physical design, pre-layout simulation, placement and routing, timing analysis, parameter extraction, design rule check and post-layout simulation. The design layout 122 may be converted from description texts into their visual equivalents to show a physical layout of the depicted patterns, such as the dimensions, shapes and locations thereof. In an embodiment, the design layout 122 can be expressed in a suitable file format such as GDSII, DFII, Oasis or the like.

The mask house 130 receives the design layout 122 from the design house 120 and manufactures one or more masks according to the design layout 122. In an embodiment, the mask house 130 includes a mask data preparation block 132, a mask fabrication block 144 and a mask inspection block 146. The mask data preparation block 132 modifies the design layout 122 so that a resulting design layout 134 can allow a mask writer to transfer the design layout 122 to a writer-readable format. Generally, the design layout 134 may include replicated cells thereon. When a mask is formed, it is repeatedly used to transfer the patterns of the cells to a semiconductor wafer, wherein the pattern transfer is done with an exposure field in each shot. In addition, scribe line regions or test structures may be formed in spaces between the exposure fields. In some embodiments, the mask data preparation block 132 is configured to determine the locations of dies that are to be included in a cell, the locations and widths of scribe line regions around the cells, and the locations and types of test structures to be formed in the scribe line regions. The operations of the mask data preparation block 132 are described in greater detail with reference to FIG. 2.

The mask fabrication block 144 is configured to form a mask by preparing a substrate based on the design layout 134 provided by the mask data preparation block 132. A mask substrate is exposed to a radiation beam, such as an electron beam, based on the pattern of the design layout 134 in a writing operation, which may be followed by an etching operation to leave behind the patterns corresponding to the design layout. In an embodiment, the mask fabrication block 144 introduces a checking procedure to ensure that the layout data complies with requirements of a mask writer and/or a mask manufacturer and that the layout data can be used to generate the mask (photomask or reticle) as desired. An electron-beam (e-beam), multiple e-beams, an ion beam, a laser beam or other suitable writer source may be used to transfer the patterns. As a result, the patterns of the cells as acquired are transferred to a semiconductor substrate (such as a wafer) or material layers disposed on the semiconductor substrate. Moreover, the mask can be fabricated in various technologies. In an embodiment, the mask is fabricated using binary technology in which a binary mask includes a transparent substrate (e.g., fused quartz) and an opaque material (e.g., chromium) coated on the opaque regions of the mask. In another example, the mask is fabricated using a phase shift technology, e.g., a phase shift mask (PSM).

After the mask is fabricated, the mask inspection block 146 inspects the fabricated mask to determine if any defects, such as full-height and non-full-height defects, exist in the fabricated mask. If any defects are detected, the mask may be cleaned or the design layout in the mask may be modified.

The IC manufacturer 150 is an IC fabrication entity that includes multiple manufacturing facilities for the fabrication of a variety of different IC products. The IC manufacturer 150 uses the mask fabricated by the mask house 130 to fabricate a semiconductor wafer 152 having a plurality of IC devices 160 thereon. The semiconductor wafer 152 may include a silicon substrate or another suitable substrate including various layers formed thereon. In an embodiment, the IC manufacturer 150 includes a wafer testing block 154 configured to ensure that the IC conforms to physical manufacturing specifications and mechanical and/or electrical performance specifications. In some embodiments, the test structures formed on the wafer 152 may be utilized to generate test data indicative of the quality of the fabricated semiconductor wafer 152. After the wafer 152 passes the testing procedure performed by the wafer testing block 154, the wafer 152 may be diced (or sliced) along the scribe line regions to form separate IC devices 160. The dicing process can be accomplished by scribing and breaking, by mechanical sawing (e.g., with a dicing saw) or by laser cutting.

Figure 2A:
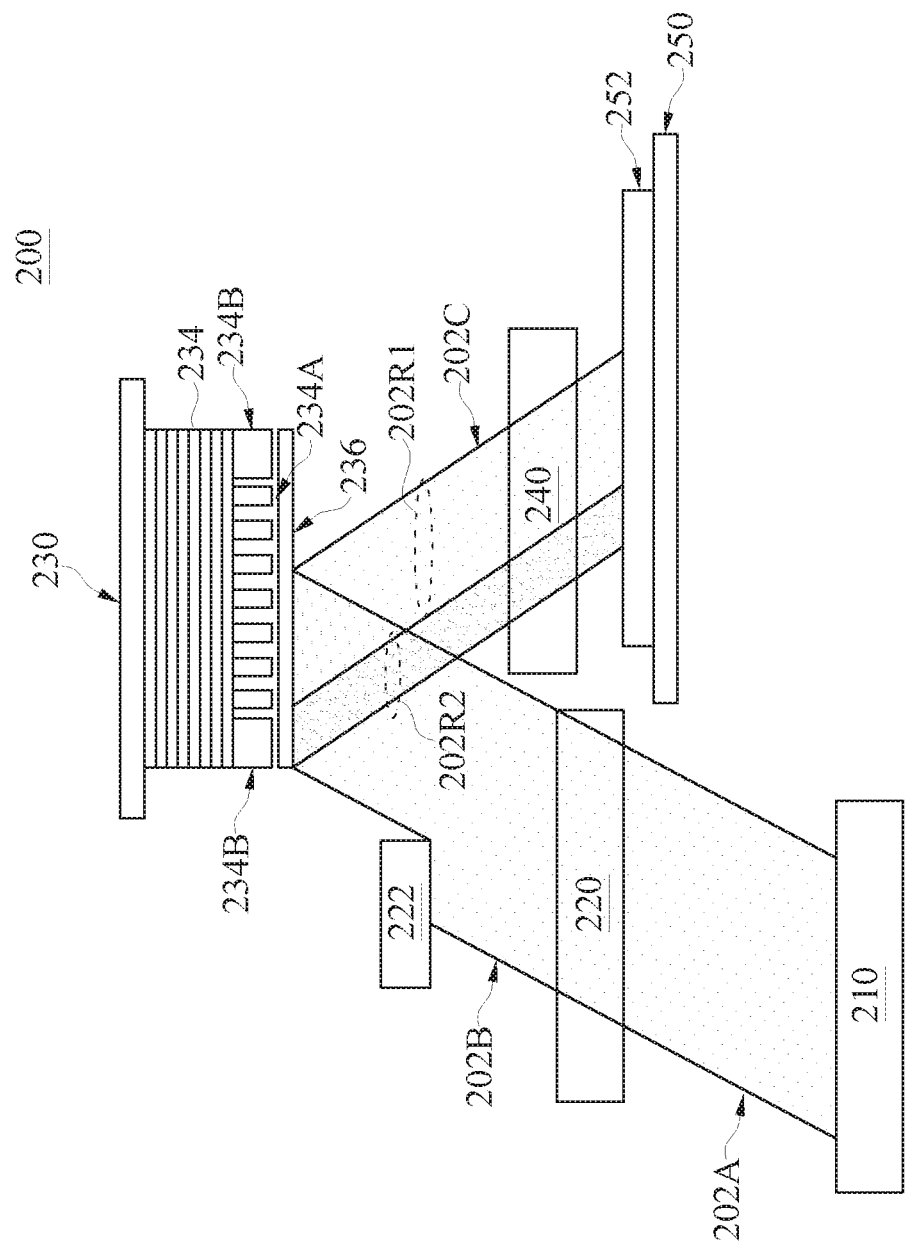
FIG. 2A is a schematic diagram of a lithography system, in accordance with some embodiments.

FIG. 2A is a schematic diagram of a lithography system 200, in accordance with some embodiments. The lithography system 200 is an EUV lithography system in the depicted example, but may be another type of lithography system, such as a deep ultraviolet (DUV) lithography system or a transmissive-type lithography system. The lithography system 200 may be used in the mask fabrication block 144 to manufacture the mask. The lithography system 200 includes an illumination source 210, an illumination optics module 220, a mask stage 230, a projection optics module 240 and a wafer stage 250. It should be understood that other modules may be incorporated in the lithography system 200, although they are not shown in FIG. 2A for brevity.

The illumination source 210 is operable to generate a radiation beam 202A having a wavelength suitable for lithography, for example, a wavelength smaller than about 50 nanometers (nm), or even as small as about 10 to 15 nm in some cases. Specifically, the wavelength of the radiation beam 202A may be set at about 13.5 nm for EUV lithography systems. In some embodiments, the illumination source 210 generates the radiation beam 202A in a laser-produced plasma (LPP) or a discharge-produced plasma (DPP) system, in which a high-power laser is used to generate a high-energy plasma to thereby form the radiation beam 202A. In some embodiments, the illumination source 210 includes a vacuum chamber to generate the radiation beam 202A. The lithography system 200 can achieve enhanced resolution of the circuit pattern due to the small wavelength of the radiation beam 202A.

The illumination optics module 220 is formed of one or more optical components to collect, guide or shape the incident radiation beam 202A from the illumination source 210 into a radiation beam 202B radiating toward the mask stage 230. For example, the illumination optics module 220 may include a collector to collect the radiation beam 202A generated by the illumination source 210. The illumination optics module 220 may also include a plurality of mirrors to reflect the radiation beam 202A. The materials of the mirrors are selected to minimize radiation absorption of the radiation beam 202A. In some embodiments, the mirrors may include a stack of alternating molybdenum (Mo) and silicon (Si) layers to reduce absorption of the radiation beams 202A. In some cases, an additional anti-absorption coating may also be utilized to further reduce radiation absorption. In some embodiments, the illumination optics module 220 is enclosed in a vacuum chamber to reduce the effect of radiation absorption by ambient gases.

In some embodiments, the lithography system 200 further includes a reticle edge masking assembly (REMA) 222 between the illumination optics module 220 and the mask stage 230. In some embodiments, the lithography system 200 includes two REMA units 222, wherein each REMA is disposed on one of two sides of the mask stage 230. The REMA 222 includes a slit to allow the radiation beam 202B to pass through. The slit is able to translate in a direction perpendicular to the incident radiation beam 202B. In some embodiments, the portion of the radiation beam 202B outside of the slit is blocked and does not propagate through the REMA 222.

The mask stage 230 is configured to hold a mask 234, in which the mask 234 comprises circuit patterns to be transferred to a workpiece 252, such as a semiconductor wafer, on the wafer stage 250, by patterning the incident radiation beam 202B. In some embodiments, the mask 234 includes a multi-layered structure. In the present embodiment, the mask 234 is a reflective-type mask, such as a phase shift mask, but may also be a transmission-type mask in other embodiments. The phase shift mask may be an attenuated phase shift mask (AttPSM) or an alternating phase shift mask (AltPSM).

The mask 234 is partitioned into an imaging region 234A and a border region 234B surrounding the imaging region 234A from a top-view perspective. The imaging region 234A includes circuit patterns formed on a stack of light-reflective structure and is configured to form a patterned radiation beam 202C through reflection (or filtering in the case of a transmission-type mask) of the incident radiation beam 202B via the patterns on the imaging region 234A. The border region 234B is configured to absorb or block a portion of the incident radiation beam 202B from being emitted to the projection optics module 240. As a result, the border region 234B can help prevent the patterned radiation beam 202C intended for one exposure field from being radiated onto adjacent exposure fields. As a result, unexpected exposure of the radiation beam 202B in peripheral areas of an adjacent exposure field can be reduced by the border region 234B.

The lithography system 200 may further include a pellicle assembly 236 disposed over the mask stage 230. The pellicle assembly 236 is configured to protect the mask 234 from contamination, such as foreign particles or dust, during the lithography operation. In some embodiments, the pellicle assembly 236 covers or seals the mask 234 in conjunction with the mask stage 230. In some embodiments, the pellicle assembly 236 includes a transparent film over the surface of the mask 234 and a frame (not separately shown) coupled to the transparent film, in which the frame laterally surrounds the mask 234 and provides mechanical support of the transparent film.

The transparent film allows the radiation beams 202B to radiate onto the light-reflective structure of the mask 234 and form the patterned radiation beam 202C that passes through the transparent film. In some embodiments, the transparent film includes silicon, such as polycrystalline silicon, amorphous silicon, doped silicon (such as phosphorous doped silicon), a silicon-based compound, polymer, graphene or other suitable material. The transparent film may have a thickness in a range between about 30 nm and about 80 nm. In some embodiments, the pellicle assembly 236 includes a capping layer (not separately shown) disposed on one or two sides of the transparent film and configured to protect the transparent film from damage or contamination.

The radiation beam 202B is directed from the illumination optics module 220 to the mask on the mask stage 230, and then emitted as the radiation beam 202C to the projection optics module 240. The projection optics module 240 may include one or more reflective mirrors, lenses, condensers, etc. In some embodiments, the projection optics module 240 may include ring field optics components. In some embodiments, the projection optics module 240 includes an aperture (or a slit) that is shaped like an arc to allow the patterned radiation beam 202C to pass to the wafer on the wafer stage 250.

The wafer stage 250 is configured to secure the workpiece 252 that is to be patterned. In some embodiments, the wafer stage 250 includes an electronic chuck (E-chuck) to secure the workpiece 252 using electronic force. In other embodiments, the wafer stage 250 includes clamps to mechanically secure the workpiece 252. The wafer stage 250 may include positioning devices to move the workpiece 252 during the lithography operation such that various regions of the workpiece can be stepped and scanned in succession. In some embodiments, the wafer stage 250 is positioned beneath the projection optics module 240.

Still referring to FIG. 2A, in some embodiments, the pellicle assembly 236 should ideally provide substantially zero reflectivity with respect to the radiation beam 202B such that, of the radiation beam 202C, only a radiation beam 202R1, corresponding to the imaging region 234A, will be radiated onto the workpiece 252 through the projection optics module 240. Another portion of the radiation beam 202C, shown in FIG. 2A as the radiation beam 202R2 reflected from over the border region 234B, is controlled to not reflect onto the workpiece 252. To achieve such objective, the pellicle assembly 236 needs to have a low reflectivity with respect to the radiation beam 202B. In some embodiments, the pellicle assembly 236 has a reflectivity in a range between about 0.05% and about 0.1% with respect to the incident radiation beam 202B under the wavelength of EUV radiation. However, such a low reflectivity may still cause an amount of the reflected radiation beam 202R2 to radiate onto the peripheral areas of exposure fields adjacent to a targeted exposure field during a lithography operation. Therefore, the resultant line width of the pattern in the peripheral areas of the design layout 122 may be greater than, or otherwise deviate from, the expected line width due to an exposure that is greater than necessary. In view of the above, there is a need to resolve the problem of exposure non-uniformity across the exposure field, as discussed in greater detail in subsequent paragraphs.

Figure 2B:
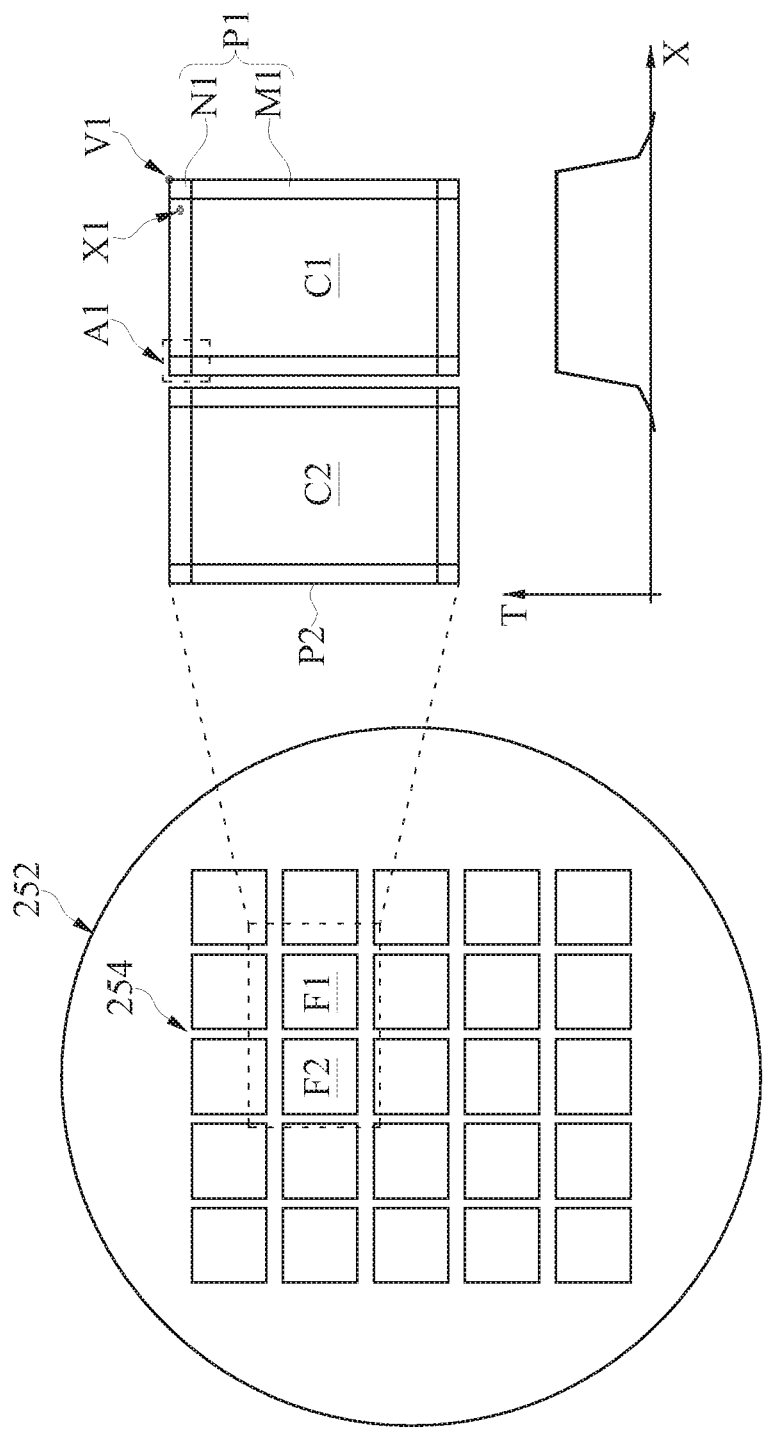
FIG. 2B is a schematic top view of a semiconductor wafer, in accordance with some embodiments.

FIG. 2B is a schematic top view of the workpiece 252, in accordance with some embodiments. The workpiece 252 is shown as a semiconductor wafer on which an array of exposure fields are defined including exemplary exposure fields F1 and F2. The adjacent exposure fields are separated by a grid of scribe lines 254. The exposure fields F1 and F2 may have a quadrilateral shape, such as a rectangular or square shape. As discussed previously, when the radiation beam 202C is incident on a target exposure field, for example field F1, the radiation beam 202R2 of the radiation beam 202C reflected from an area of the pellicle assembly 236 over the border region 234B of the mask 234 will radiate onto adjacent exposure fields, such as the exposure field F2. FIG. 2B also illustrates a zoomed-in image of the exposure fields F1 and F2. The exposure fields F1 and F2 define respective central regions C1 and C2 and respective peripheral regions P1 and P2. The peripheral region P1 or P2 is located around a boundary of the exposure field F1 or F2, respectively, and surrounds the respective central region C1 or C2. In some embodiments, assuming the radiation beam 202C is targeted at and irradiates the exposure field F1, the peripheral region P2 of the exposure field F2 is defined as a region receiving excess exposure from the radiation beam 202R2 while the central region C1 of the exposure field F1 is defined as a region receiving normal exposure of radiation beam 202R1 substantially free from the radiation beam 202R2. Further, the peripheral region P1 or P2 may be partitioned into side regions M1 and corner regions N1 in which the corner region N1 covers an area of the peripheral region P1 or P2 that includes a vertex, e.g., vertex V1, of the exposure field F1 or P2, respectively. In some embodiments, the side region M1 may receive about twice the amount of the normal exposure if there is another exposure field adjacent to the side region M1. In some embodiments, the corner regions N1 may receive about two to four times the amount of the normal exposure, depending on the number of exposure fields adjacent to the corner region N1.

In some embodiments, the exposure distribution in the peripheral region P1 is non-uniform. FIG. 2B illustrates a schematic exposure distribution of the radiation beam 202C across the exposure fields F1 and F2 below the zoomed-in image of exposure fields F1 and F2. The vertical axis represents the exposure intensity T of the radiation beam 202C2, and the horizontal axis represents the horizontal location X of the workpiece. In some embodiments, the exposure amount at a location X1 decreases with distance between the location and a side closest to the location X1. In some embodiments, the exposure amount of the location X1 decreases with distance between the location X1 and a vertex, e.g., V1 of the exposure field F1, closest to the location X1.

Figure 3:
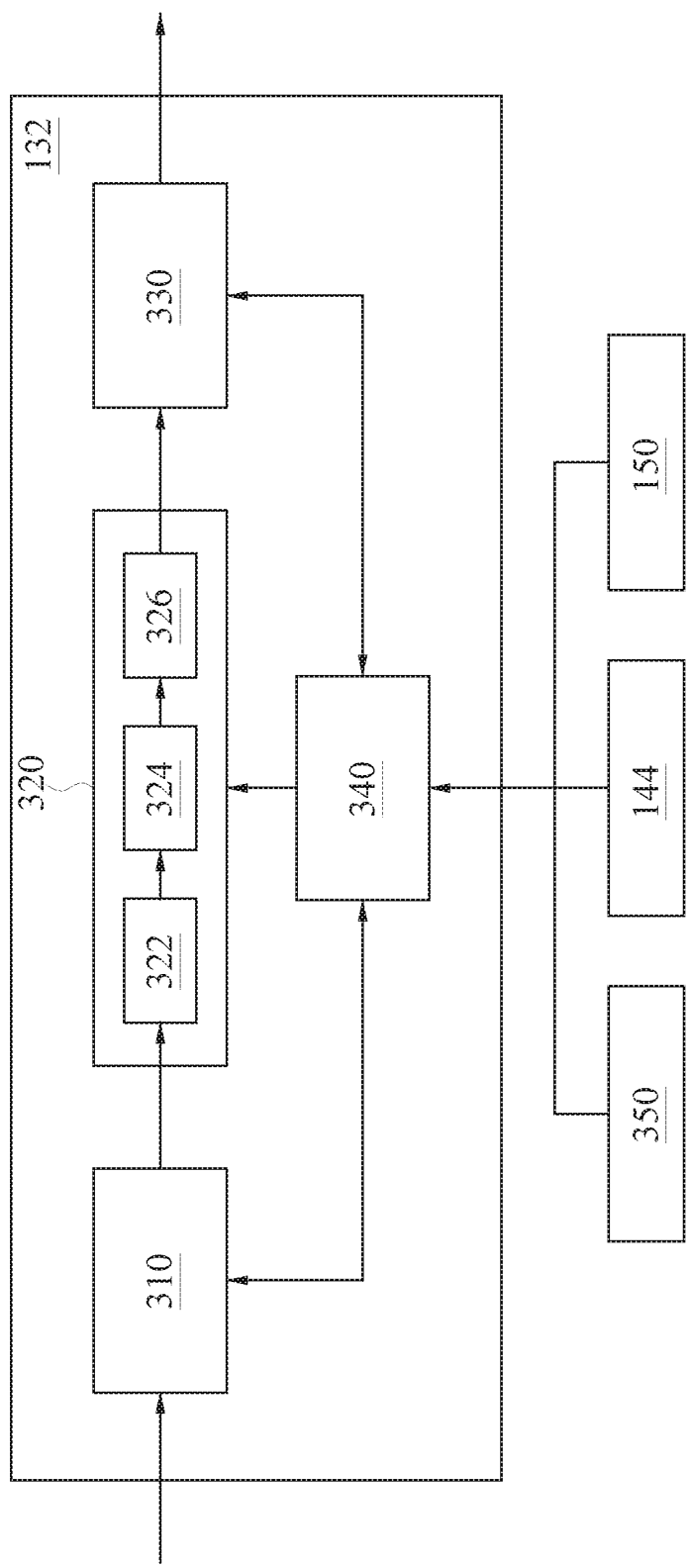
FIG. 3 is a schematic diagram showing a data preparation block in the integrated circuit (IC) manufacturing system of FIG. 1, in accordance with some embodiments.

FIG. 3 is a schematic diagram showing the mask data preparation block 132 in the IC manufacturing system 100 of FIG. 1, in accordance with some embodiments. The mask data preparation block 132 includes a logic operation (LOP) module 310, an optical proximity correction (OPC) module 320, a lithography process check (LPC) module 330 and a layout periphery adjustment (LPA) module 340.

The LOP module 310 receives or defines a set of design rules representing the manufacturing constraints from various manufacturers to check the design layout 122. The design rules may include the line width requirements, spacing requirements between adjacent features, and the like. These design rules are usually implemented as logic operations. The LOP module 310 further processes the design layout 122 and modifies the design layout 122 according to specified manufacturing rules. If the features, e.g., the polygons, in the design layout 122 do not comply with the set of rules, the design layout 122 will be modified accordingly by the LOP module 310 until the modified design layout 122 complies with such rules. The modification of the design layout 122 performed by the LOP module 310 may include resizing, reshaping or reallocating the features of the design layout 122.

The OPC module 320 is configured to perform a rule-based or model-based modification to the design layout 122. The design layout 122 is revised or adjusted according to predetermined correction rules and models. For example, the OPC module 320 is configured to apply a model-based lithography enhancement technique to compensate for imaging errors, such as diffraction, interference, or other effects arising from the lithography process. In some embodiments, the OPC module 320 takes into account the flare effect or slit effect of lithography operations resulting from the defects of the optical elements in the lithography system 200. In some embodiments, the OPC module 320 is aimed at generating a target pattern of the design layout 122, in which the target pattern conforms to requirements of the electrical and physical functionalities sought by the design layout 122 despite the geometric differences between the design layout 122 and the target pattern. The target pattern is also used as a reference in determining differences between the desired circuit pattern and a simulated manufactured pattern.

In some embodiments, the OPC module 320 includes an assist feature block 322, a retarget block 324 and a model-based adjustment (MBA) block 326.

In an embodiment, the assist feature block 322 adds sub-resolution assist features to the design layout 122. The sub-resolution assist feature is differentiated from the original feature (referred to herein as a main feature or main pattern) of the design layout 122 in that the sub-resolution assist feature does not form a resolvable or printable feature on the mask, whereas the main feature is a resolvable or printable feature. In some embodiments, the sub-resolution assist feature has a line with less than the minimal resolvable size of the design layout 122. The sub-resolution assist feature is usually disposed in a sparsely-arranged area to make the feature density more uniform across the design layout 122 and thus improve the exposure performance of the main feature. In some embodiments, the sub-resolution assist feature includes one or more scattering bars.

In some embodiments, the assist feature block 322 adds an auxiliary feature, which has a pattern of a serif, a hammerhead, a jog or other suitable pattern, to a side or an end of a feature. In some embodiments, the auxiliary features are formed having a size greater than the minimal resolvable size of the design layout 122, and used in reshaping the pattern of the design layout 122 such that the manufactured pattern is made closer to the pattern in the design layout 122. In some embodiments, the auxiliary feature may be in the form of a pointed extension positioned on a corner of a pattern to sharpen the corner in the fabricated pattern.

In some embodiments, the retarget block 324 is configured to perform adjustment on the features of the design layout 122, e.g., repositioning, resizing, reshaping, or a combination thereof. The features are generally represented as polygons. In some embodiments, the retarget block 324 performs dissection on the contour or edge of the polygons. During the dissection process, the contour or the edge of a feature, e.g., a polygon, of the design layout 122 is dissected into edge segments (sometimes called segments) by dissection lines or dissection points. In such situation, the retarget block 324 performs the task of adjusting (e.g., reshaping or relocating) the polygons in the design layout 122 on a segment basis. The adjustment may be performed in a rule-based manner according to a set of retargeting rules. The adjustment of the retarget block 324 generates a pattern of the design layout 122 serving as a target pattern to be compared to a simulated manufactured pattern according to the target pattern. The adjustment of the edge segments is conducted with the aim of reducing the difference between the target pattern and the simulated manufactured pattern. In some embodiments, target points (not separately shown) on the edges of the polygons are determined and used for calculating the pattern difference. The edge dissection and adjustment operations may be performed repeatedly. The edge dissection and target point assignment may need to be performed again followed by the calculation of the pattern difference between the retargeted pattern and the simulated manufactured pattern. In some embodiments, the sub-resolution assist feature formed in the design layout 122 is not subjected to dissection and retargeting.

In some embodiments, the MBA block 326 performs model-based adjustment on the design layout 122. The model-based adjustment is conducted according to an optical model established for simulating the exposure performance of the design layout 122. The MBA block 326 may perform lithography enhancement including resizing the original pattern, repositioning an edge of the original pattern, or reshaping the original pattern with respect to each edge segment of the design layout 122. The enhancement may include addition or removal of the sub-resolution assist features in the design layout 122 according to established optical models or rules. In some embodiments, the enhanced design layout 122 comprises a revised pattern serving as a target pattern, and the target pattern is compared to the simulated manufactured pattern for determining whether the simulated manufactured pattern is closer to the target pattern derived in the MBA block 326, or whether the difference between the simulated manufactured pattern and the target pattern falls within the specification.

In some embodiments, the assist feature block 322, the retarget block 324 and the model-based adjustment (MBA) block 326 are repeated until the difference between the target pattern and the simulated manufactured pattern meets the design requirement of the OPC module 320. It should be understood that one or more of the abovementioned blocks in the OPC module 320 may be deleted, or extra blocks may be added to the OPC module 320. Additionally, in some embodiments, the order of the blocks 322, 324 and 326 may be changed.

The LPC module 330 is configured to simulate the fabrication procedure that is to be implemented by the IC manufacturer 150. The simulation may cover the entirety or a portion of the design layout 122. In the present embodiment, the LPC module 330 simulates the design layout 122 undergoing the procedures of the LOP module 310 and the OPC module 320. In some embodiments, the LPC module 330 is configured to inspect the design layout 122 and detect any potential problematic areas, known as "hot spots," that may appear in the IC device 160. The term "hot spot" refers to a feature in the IC device 160 that exhibits characteristics negatively affecting the performance of the device. A hot spot can arise from the circuit design and/or process controls. Symptoms of hot spots include pinching/necking, bridging, dishing, erosion, resistance-capacitance (RC) delay, line thickness variations and other problems.

The LPA module 340 is connected to each module in the mask data preparation block 132, such as the LOP module 310, the OPC module 320 and the LPC module 330. The LPA module 340 may perform layout adjustment on the design layout 122, similar to the layout adjustment performed by other blocks in the OPC module 320; however, the LPA module 340 specifically addresses the layout defects arising from overexposure in the peripheral region of the exposure field on the workpiece 252. In some embodiments, the overexposure issue in the peripheral region is mainly attributed to the leaked radiation beams reflected by a pellicle assembly (e.g., the pellicle assembly 236 in FIG. 2A). In some embodiments, the adjustment of the pattern or edge segment by the LPA module 340 is independent of the adjustment conducted by other modules of the mask data preparation block 132, and can be performed at any suitable time prior to or subsequent to the component modules in the mask data preparation block 132. In some embodiments, the overexposure issue can be sufficiently addressed by limiting adjustment by the LPA module 340 to a single iteration before the adjustment of the design layout 122 is completed, thus eliminating the need to regressively perform the LPA module 340.

In some embodiments, the model-based OPC operation is performed prior to the layout adjustment operation by the LPA module 340. In some embodiments, the assist feature block 322 is performed prior to the layout adjustment operation by the LPA module 340. In some embodiments, the sub-resolution feature added by the assist feature block 322 is not subjected to the layout adjustment operation by the LPA module 340. In some embodiments, the sub-resolution feature added by the assist feature block 322 is adjusted by the LPA module 340. In some embodiments, a retargeting operation by the retarget block 324 is performed subsequent to the layout adjustment by the LPA module 340.

In some embodiments, the LPA module 340 is connected to a pellicle control data (PCD) module 350 and performs the layout adjustment according to parameters of the PCD module 350, in which the parameters of the PCD module 350 may include the reflectivity values or a reflectivity distribution of the pellicle assembly 236 with respect to the radiation beam 202B of interest. In other embodiments, the PCD module 350 may also collect data of the dimensions or ratios of the areas in an exposure field affected by the pellicle assembly-reflected radiation beams, e.g., the area of the peripheral region P1 in the exposure field F1 shown in FIG. 2B. In some embodiments, the PCD module 350 is incorporated in the mask data preparation block 132, or alternatively is performed external to the mask data preparation block 132 in the mask house 130.

In some embodiments, the LPA module 340 performs predictive layout adjustment based on collected historic manufacturing data, which may be stored and abstracted at the PCD module 350. The parameters for the pellicle assembly 236 may be collected from different lithography equipment or under different processing conditions. In some embodiments, the LPA module 340 performs layout adjustment based on feedback from the manufactured data using the same pellicle assembly 236 or the same lithography system 200. In some embodiments, the LPA module 340 is connected to the mask fabrication block 144 or the IC manufacturer 150 and performs layout adjustment based on the manufactured pattern in an after-development inspection (ADI) contour image of the fabricated mask, or based on the circuit pattern of the fabricated wafer 152.

Figure 4A:
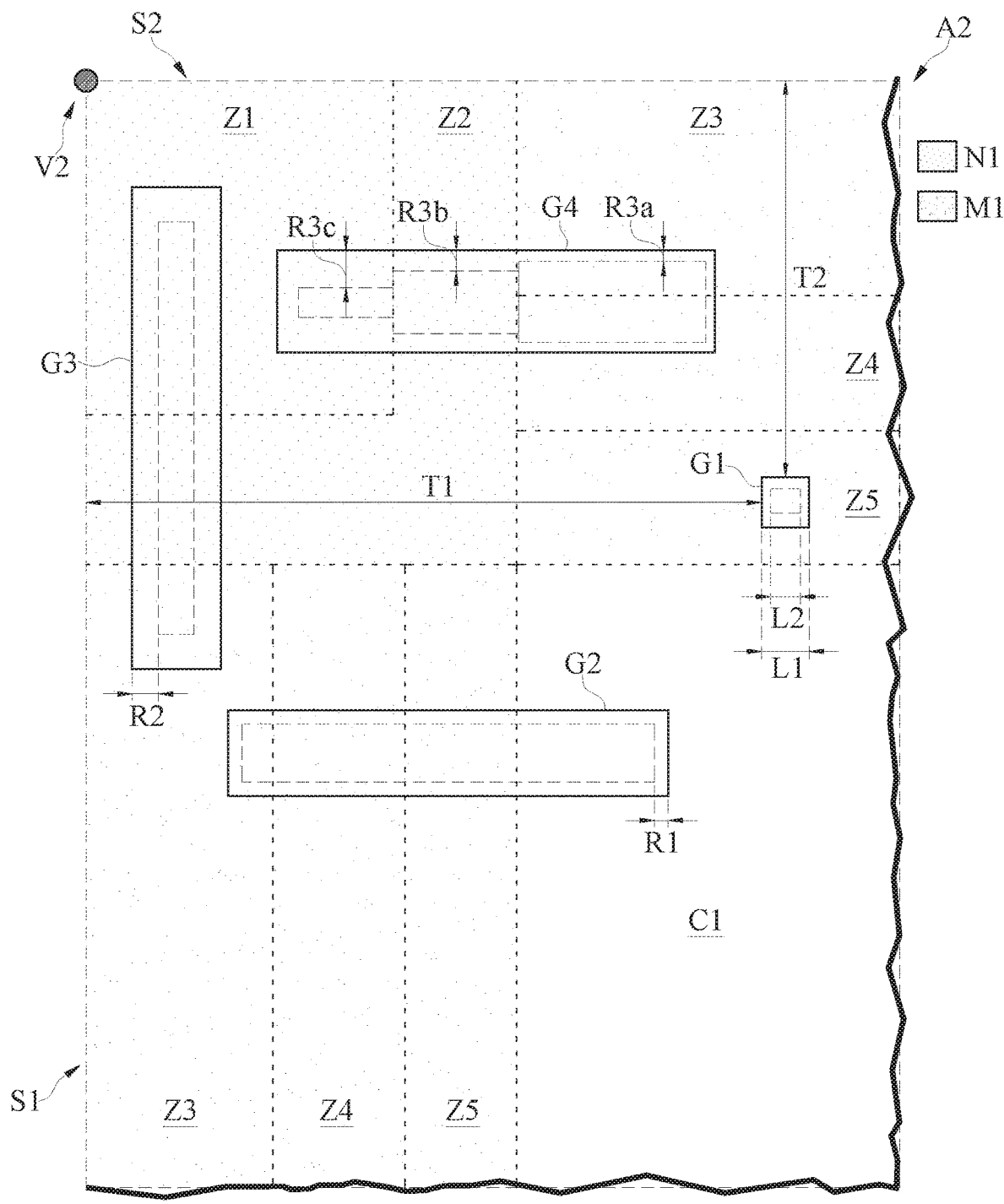
FIGS. 4A and 4B are schematic diagrams of a design layout undergoing a layout periphery adjustment operation, in accordance with some embodiments.

FIG. 4A is a schematic diagram of the design layout 122 undergoing a layout periphery adjustment (LPA) operation, in accordance with some embodiments. The LPA operation may be performed by the LPA module 340 in the mask data preparation block 132 shown in FIG. 3. FIG. 4A illustrates an enlargement of a portion A2 that includes a corner of the design layout 122, wherein the portion A2 is to be transferred to a corresponding portion A1 of the exposure field F1 illustrated in FIG. 2B.

Referring to FIGS. 2B and 4A, the portion A2 of the design layout 122 has sides S1 and S2 perpendicular to each other, and a vertex, such as vertex V2, where the sides S1 and S2 meet. The LPA operation also defines compensation zones in the peripheral region P1. The compensation zones are delimited basically according to the amounts of overexposure in the respective compensation zones. The compensation zones may have different configurations, shapes and areas between the side region M1 and the corner region N1. The portion A1 is bounded by the sides S1 and S2 and the vertex V2, and may be partitioned into a plurality of compensation zones, e.g., zones z1 and z2 in the corner region N1, and a plurality of compensation zones, e.g., zones z3, z4 and z5, in the side region M1.

In some embodiments, the compensation zones z1 through z5 may include different shapes, such as a polygonal shape, a circular shape, or any other suitable shape. In some embodiments, the compensation zone z1 has a quadrilateral shape, such as a rectangular or square shape. In some embodiments, the compensation zone z2 has an L-shape or an arc shape. In some embodiments, the compensation zones z1 and z2 may include the same or different areas.

In some embodiments, the compensation zones z3 through z5 have a strip shape with the same or different strip widths. In some embodiments, the compensation zones z3 through z5 may include the same or different areas. The number and shapes of the compensation zones z1 through z5 are shown for illustrative purposes only, and other numbers and configurations of the compensation zones are within the contemplated scope of the present disclosure.

The LPA operation is performed to compensate for the overexposure effect in the peripheral region P1 of the exposure field F1. A compensation amount of a feature is determined according to the amount of overexposure in the location where the feature resides. In some embodiments, the distribution of overexposure is not uniform across the corner region N1. For example, the exposure amount at the location of a polygon G1 is determined by a minimal value between a first distance T1 and a second distance T2, where the first distance T1 is measured from the polygon G1 to the side S1 and the second distance T2 is measured from the polygon G1 to the side S2. In some embodiments, the amount of overexposure of the polygon G1 is determined by the distance between the polygon G1 and the vertex V2 closest to the polygon G1. In some embodiments, the compensation amount of the size of the polygon G1 is a function, such as a minimal value or an average value, of the first distances T1 and the second distance T2. In some embodiments, the compensation amount of the size of the polygon G1 is a function of the distance between the polygon G1 and the vertex V2. Since an extra amount of exposure on a pattern usually results in expansion or enlargement of a the pattern in a manufactured device, the LPA operation adjusts the feature, such as the polygon G1, by reducing the size of the feature (e.g., reducing a length of an edge of the polygon G1 from a length L1 to a length L2 less than L1) or moving the edges of the polygon G1 toward the center of the polygon G. Throughout the present disclosure, the original edges of the polygon (e.g., polygon G1) are represented by solid lines while the edges of the polygon adjusted by the LDA operation are represented by dashed lines.

FIG. 4A also illustrates three features in the design layout 122, i.e., polygons G2, G3 and G4 in the peripheral region P1, in which the polygons G2, G3 and G4 are represented by lines. The polygon G2 extends in the side region M1 in a direction substantially parallel to the side S2 and stretches toward the central region C1, the polygon G3 extends in the side region M1 and the corner region N1 in a direction substantially parallel to the side S1, and the polygon G4 extends in the side region M and the corner region N1 in a direction substantially parallel to the side S2. In some embodiments, the polygons G2, G3 and G4 do not undergo any dissection operation.

In some embodiments, the LDA operation adjusts the shapes of the polygons G2, G3 and G4 by reducing the line widths of the respective polygons by predetermined amounts or values. In some embodiments, the LDA operation reduces the line lengths of the polygons G2, G3 and G4 by predetermined amounts or values. In some embodiments, the LDA operation adjusts the shapes of the polygons G2, G3 and G4 by moving the edges of the respective polygons toward the center of the respective polygons by predetermined amounts or values. In some embodiments, the adjustment amount of the line width (or line length), which is also referred to as a compensation amount or reduction amount, is represented as a ratio of the adjusted amount of the line width (or line length) to the original line width (or original line length). In other words, the compensation amount is represented as a ratio of the original line width or a ratio of the original line length. For example, in some embodiments, the reduced amount of the line width (or line length) is between about 0.1% and about 10% of the original line width (or original line length). In some embodiments, the reduced amount of the line width (or line length) is between about 0.1% and about 5% of the original line width (or original line length). In some embodiments, the reduced amount of the line width (or line length) is between about 0.1% and about 2.5% of the original line width (or original line length). In some embodiments, the reduction amount of the line width is between about 0.1 nm and about 0.5 nm, or between about 0.1 nm and about 0.25 nm.

In some embodiments, the adjustment (compensation) amount of the line width or the line length is different in different compensation zones. In some embodiments, if a compensation zone is closer to the side or corner of the design layout 122, such compensation zone is assigned a greater compensation amount. For example, the compensation zone z1 is assigned a compensation value greater than the compensation amounts of the compensation zones z2 through z5. In some embodiments, the compensation zones z1 through z5 have decreasing compensation values. In some embodiments, the compensation zones (e.g., zone z or z3) that are closer to the side or the vertex of the design layout 122 are given greater compensation values than the compensation zones (e.g., zone z4 or z5) that are more distal to a side or vertex of the design layout 122. The compensation (reduction) amount applied to the line width or the line length of a polygon may be equal or different along a same edge of the polygon G2, G3 or G4 across different regions of the design layout 122. For example, the line widths of the polygon G2 are reduced by a uniform amount R1 across the compensation zones z3, z4, z5 and the central region C1. Similarly, the line widths of the polygon G3 are reduced by a uniform amount R2 across the compensation zones z3, z4, z5 and the central region C1. In some embodiments, the reduced amount R1 or R2 is determined according to the compensation value associated with one of the compensation zones overlapping the respective polygon G2 or G3. In some embodiments, the reduced amount R1 or R2 is determined as a maximal value of the compensation values for the candidate compensation zones, in which the candidate compensation zones overlap the respective polygon G2 or G3. For example, the reduction amount R1 is determined as the compensation value of the compensation zone z3 while the reduction amount R2 is determined as the compensation value of the compensation zone z1. In some embodiments, the reduction amount R1 is different between the line width and the line length of the polygon G2. The same principle also applies to the polygon G3. In some embodiments, different edges of the polygon G2 or G3 have different reduction amounts.

In some embodiments, the line widths of the polygon G4 are reduced by different amounts R3a, R3b and R3c in the compensation zones z1, z2 and z3, respectively. The reduction amounts R3a through R3c for the portions of the polygon G4 are determined according to the compensation values in the compensation zones z1 through z3 overlapping the respective polygon portions. The portions of the polygon G4 undergoing reduction based on different compensation values are formed within the respective compensation zones. In some embodiments, the reduction amount for the line width of the portion within the compensation zone z4 is determined to be the same as the reduction amount R3a of the compensation zone z3. In some embodiments, the reduction amount R3a, R3b or R3c is different between the line width and the line length.

Figure 4B:
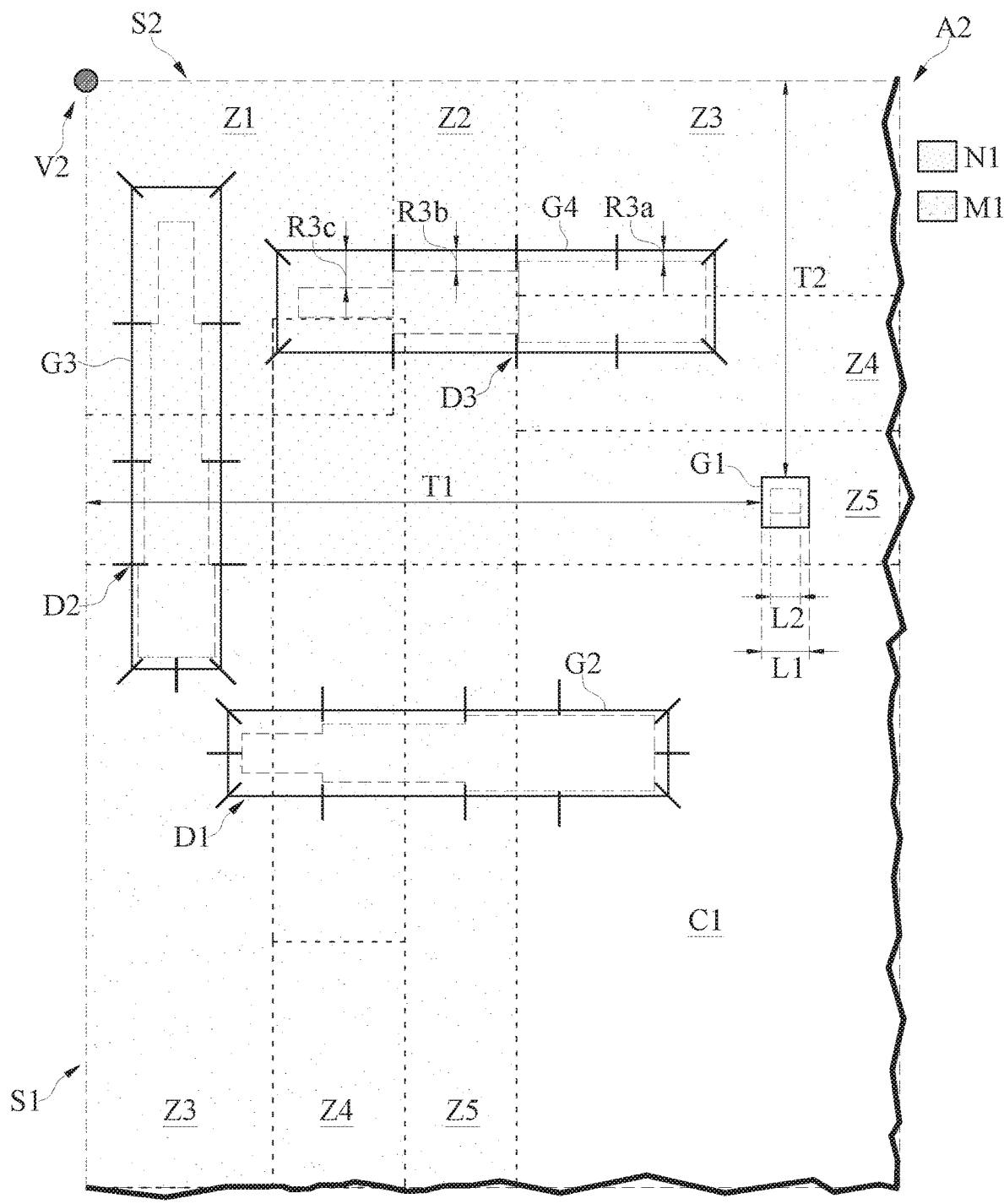

FIG. 4B is a schematic diagram of the design layout 122 undergoing the LPA operation, in accordance with some embodiments. The LPA operation may be performed by the LPA module 340 in the mask data preparation block 132 shown in FIG. 3. FIG. 4B is similar to FIG. 4A and descriptions of the layout design in FIG. 4B are not repeated for brevity, except that the edges of the polygons G2, G3 and G4 in the design layout 122 shown in FIG. 4B are dissected prior to the LPA operation. The dissection lines D1, D2 and D3 are added by the retarget block 224 in a dissection operation. Each edge of the polygons G2, G3 and G4 is dissected into edge segments. The dissection lines D1 through D3 may be aligned with or offset from the boundaries of the compensation zones z1 through z5. For example, the middle portion of the adjusted polygon G2 defined by two adjacent dissection lines D1 has a side parallel to and offset from the boundary of the compensation zone z2.

In some embodiments, the line widths of the polygon G2 are reduced by different amounts in the unit of edge segment based on the compensation zone that the polygon G2 overlaps. The adjustment process for the polygon G2 in FIG. 4B is similar to that for the polygon G4 in FIG. 4A, but the difference lies in that the line width change occurs at the compensation zone boundary in FIG. 4A, while the line width change occurs at the dissection line in FIG. 4B. In some embodiments, some of the dissection lines D3 of the polygon G4 are parallel to and aligned with the boundaries of the compensation zones (e.g., the middle portion of the adjusted polygon G4 defined by two dissection lines D3 includes sides aligned with the boundaries of the compensation zone z2), and the LPA operation performed for the polygon G4 after edge dissection may be the same as the LPA operation performed before edge dissection.

Figure 5:
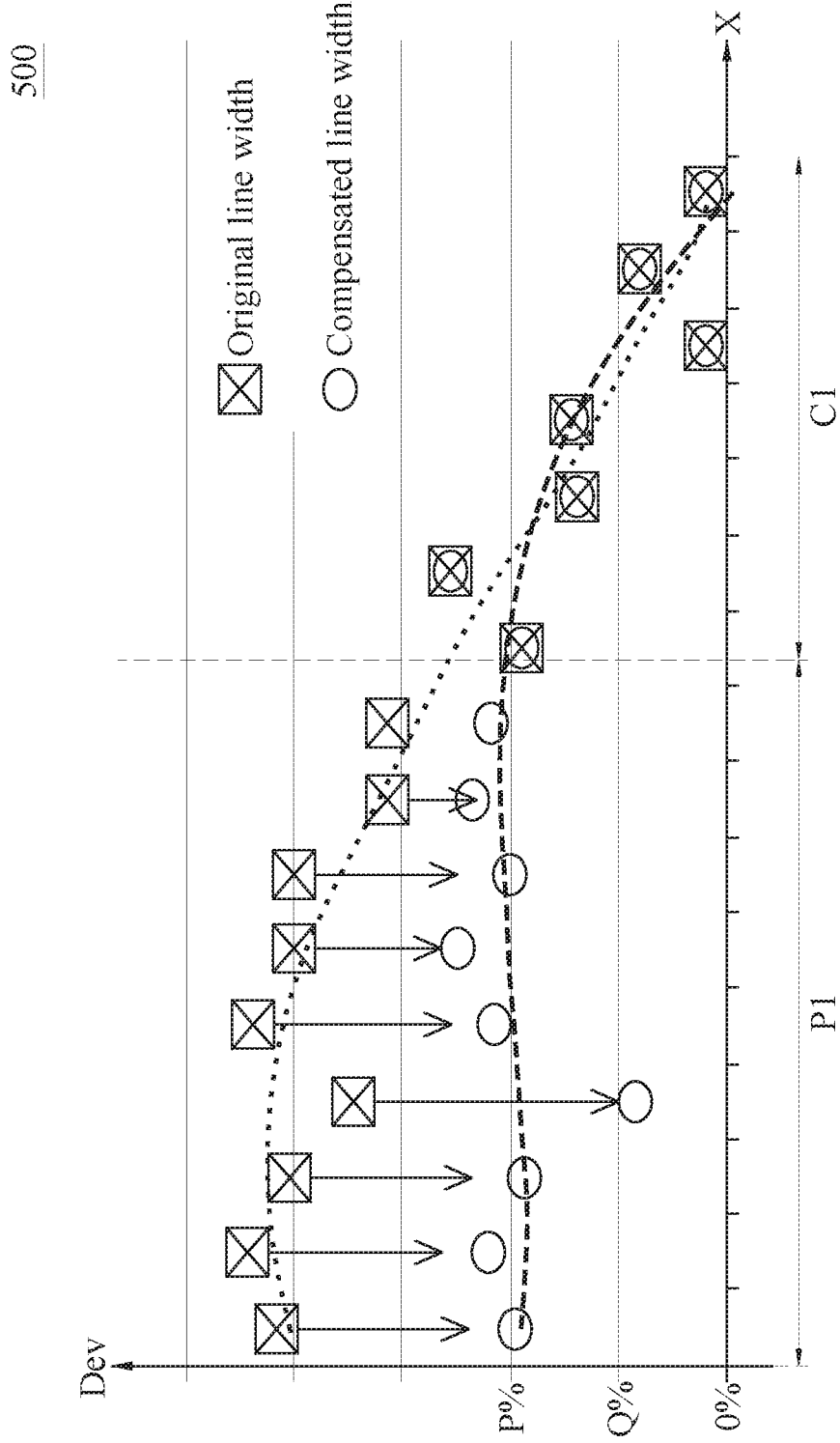
FIG. 5 is a schematic graph illustrating a layout periphery adjustment operation, in accordance with some embodiments.

FIG. 5 is a schematic graph 500 illustrating the LPA operation, in accordance with some embodiments. The graph 500 shows an embodiment of the LPA operation taking into consideration other effects, such as the disturbance effect arising from the REMA 222 illustrated in FIG. 2A. In order to address the effect of the REMA 222, the LPA operation is configured to partially compensate for the overexposure effect of the line widths in the peripheral regions. In the graph 500, simulation results of the line width of a feature in the design layout 122 before and after the LPA operation are shown as square and circular markers, respectively. The horizontal axis represents a distance X between the feature and a side of the design layout 122, e.g., the side S illustrated in FIG. 4A. The distance of X=0 denotes a side or vertex of the design layout 122. The vertical axis represents the deviation amounts DEV of the line width for the feature in terms of percentage with respect to the line width, e.g., a critical dimension (CD) of the feature. The deviation amount of 0% means the manufactured line width does not have any line width difference with respect to the line width set forth in the design layout 122. As shown in the graph 500, the deviation of the original line widths is increased from the central region C1, through the peripheral region P1 until the side S1. The LPA operation reduces the line widths of the feature residing in the peripheral region P1. The overlapping of the square markers with the corresponding circular markers in the central region C1 signifies that the line widths of the feature in the central region C1 do not receive adjustment, although the line widths still have mild line width deviations less than P % of the line width of the line width due to overexposure. In some embodiments, the value P % is between 1% and 20%, such as 10%. The arrows pointing from the square markers to the corresponding circular markers in the peripheral region P1 denotes the direction of line width reduction of the feature in the peripheral region P1.

In an embodiment, the LPA operation partially adjusts the line width and leaves an amount, e.g., Q % of the line width, of the line width in the peripheral region P1 without adjustment. In some embodiments, such unadjusted amount of the line width is compensated by the REMA unit 222 that blocks part of the overexposure. A line width that is reduced in the design layout 122 and causes the line width of the manufactured pattern to be substantially equal to the original line width under normal exposure is referred to as being "fully compensated." For example, if there exists a compensated line width represented by a circular marker in FIG. 5 (FIG. 5 does not show such a case) which hits the 0% line, such line width is referred to as fully compensated. In contrast, a line width that is reduced in the design layout 122 but still causes the line width of the manufactured pattern to be greater than (or otherwise unequal to) the original line width under normal exposure is referred to as being "partially compensated." For example, the compensated line widths represented by the circular markers in the peripheral region P1 of FIG. 5 denote partially compensated line widths that leave Q % of the line width uncompensated. The difference (e.g., Q % of the line width) of the line width of the "fully compensated" pattern and the "partially compensated" pattern is referred to as the "uncompensated amount." In some embodiments, the uncompensated amount Q % of the line width is substantially equal across different compensation zones. In some embodiments, the uncompensated amount of the line width is represented as a ratio with respect to the original line width and is between about 0.01% to about 5% of the original line width, or between about 0.01% and about 2.5% of the original line width. In some embodiments, the uncompensated amount of the line width is between about 0.01 nm and about 0.3 nm, or between about 0.01 nm and about 0.2 nm. In some embodiments, the uncompensated amount of the line width is between about 10% and about 50% of the fully compensated amount, or between about 20% and about 40% of the fully compensated amount. Through the partial LPA operation, the performances of the OPC module 320 and the mask data preparation block 132 are enhanced.

Figure 6:
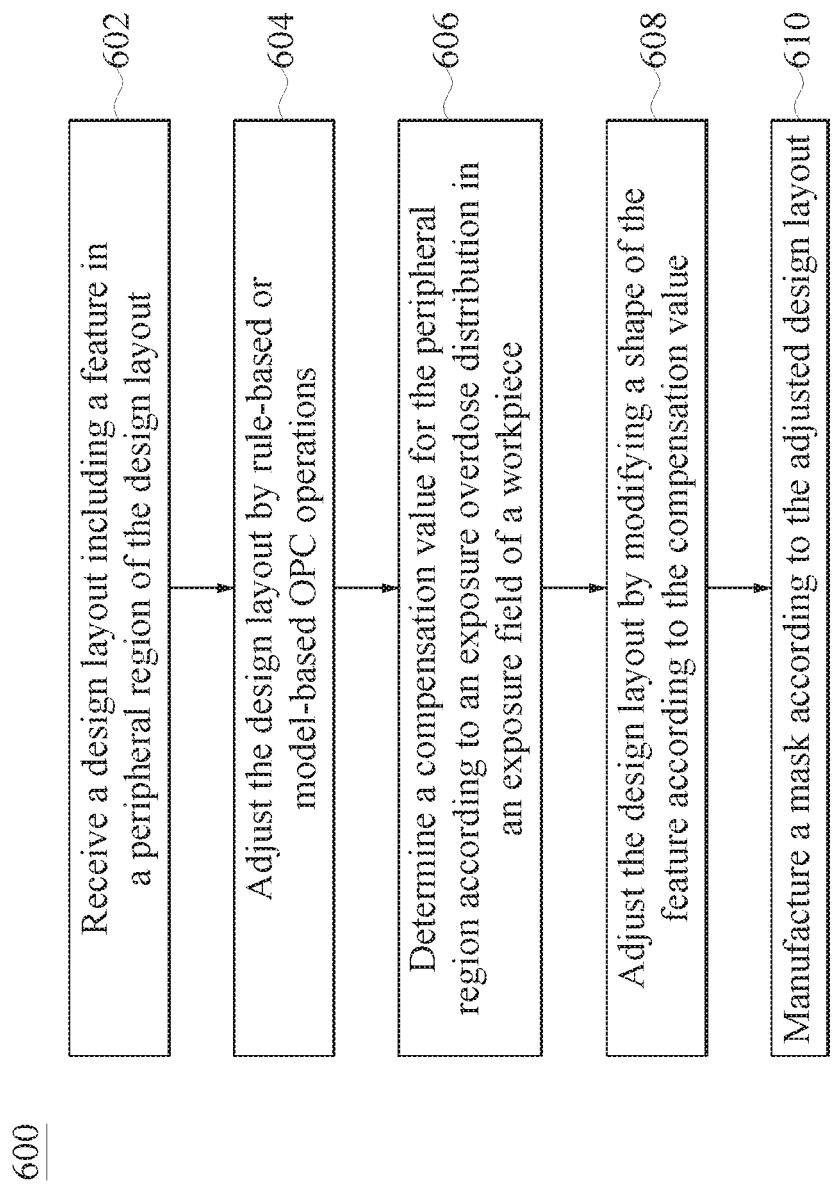
FIG. 6 is a flowchart of a method of manufacturing a mask, in accordance with some embodiments.

FIG. 6 is a flowchart of a method 600 of manufacturing a mask, in accordance with some embodiments. It should be understood that additional steps can be provided before, during, and after the steps shown in FIG. 6, and some of the steps described below can be replaced or eliminated in other embodiments of the method 600. The order of the steps may be interchangeable.

At step 602, a design layout including a feature in a peripheral region of the design layout is received.

At step 604, the design layout is adjusted by rule-based or model-based OPC operations. The rule-based OPC operations may include the rule-based adjusting operation conducted by the LOP module 310, the rule-based retargeting operation conducted by the retarget block 324 of the OPC module 320, and the model-based OPC operation conducted by the MBA block 326 of the OPC module 320. In some embodiments, the rule-based or model-based OPC operations in step 604 may or may not incorporate assist features into the design layout in a manner similar to that of the assist feature block 322 of the OPC module 320.

At step 606, a compensation value for the peripheral zone is determined according to an exposure distribution in an exposure field of a workpiece. In some embodiments, the compensation value for the peripheral zone is determined according to a reflectivity of a pellicle assembly, the pellicle assembly being disposed over a mask manufactured according to the design layout. In some embodiments, the pellicle, e.g., the pellicle assembly 236 shown in FIG. 2A, is disposed over a mask, e.g., the mask 234 shown in FIG. 2A, on which the design layout is fabricated. In some embodiments, a compensation value for the peripheral zone is determined according to pellicle-related data, wherein the pellicle-related data includes a reflectivity level of the pellicle assembly 236. In some embodiments, the pellicle-related data includes information of the dimensions or ratios of the regions in an exposure field affected by the radiation beam reflected by the pellicle assembly 236.

At step 608, the design layout is adjusted by modifying the shape of the feature according to the compensation value. In some embodiments, the shape of the feature is modified through alteration (e.g., reducing or increasing) of the line width of the feature. In some embodiments, the shape of the feature is modified by moving the edges or edge segments of the feature, e.g., toward or away from the center of the feature. In some embodiments, step 604 can be performed after step 608. In some embodiments, step 604 can be performed repeatedly and some iterations of step 604 are performed prior to step 606 and 608 while some iterations of step 604 are performed after step 608. At step 610, the mask, e.g., the mask 234 shown in FIG. 2A, is manufactured according to the adjusted design layout. In some embodiments, a lithography operation is performed that transfers the shape of the feature of the mask to the mask 234.

Figure 7:
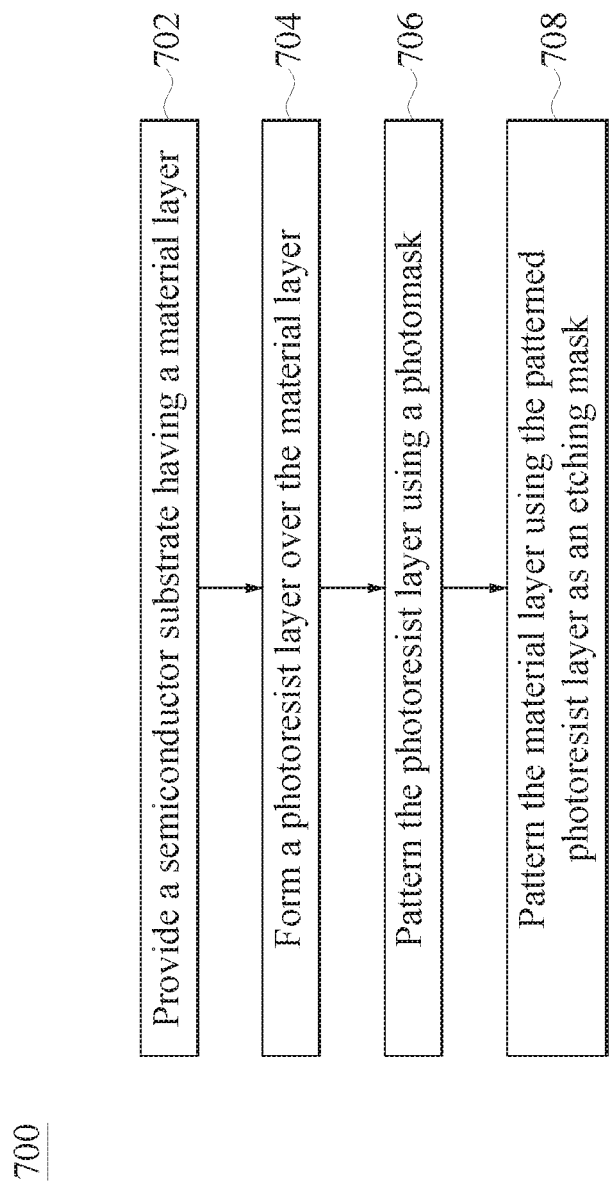
FIG. 7 is a flowchart of a method of manufacturing a semiconductor device, in accordance with some embodiments.

FIG. 7 is a flowchart of a method 700 of manufacturing a semiconductor device, in accordance with some embodiments. The semiconductor device may be manufactured using an EUV mask, such as the mask 234 described in relation to FIG. 2A. The method 700 begins at step 702, wherein a semiconductor substrate having a material layer is provided. The semiconductor substrate includes a semiconductor material such as silicon. In some embodiments, the semiconductor substrate may include other semiconductor materials, such as silicon germanium, silicon carbide, gallium arsenide, or the like. In some embodiments, the semiconductor substrate is a p-type semiconductive substrate (acceptor type) or an n-type semiconductive substrate (donor type). Alternatively, the semiconductor substrate includes another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In yet another alternative, the semiconductor substrate is a semiconductor-on-insulator (SOI) substrate. In other alternatives, the semiconductor substrate may include a doped epitaxial layer, a gradient semiconductor layer, and/or a semiconductor layer overlaying another semiconductor layer of a different type, such as a silicon layer on a silicon germanium layer.

In some embodiments, the material layer may be a semiconductor layer, a dielectric layer or a conductive layer. In some embodiments, the material layer may be embedded in the semiconductor substrate or deposited over the semiconductor substrate. The material layer may be formed of a single layer or may include a multilayer structure.

At step 704, a photoresist layer is formed over the material layer. The photoresist layer may be formed over the material layer by CVD, PVD, ALD, spin coating, or other suitable film-forming method. Next, the method 700 continues with step 706, in which the photoresist layer is patterned using a mask, such as the EUV mask 234 as described above, in a lithography operation. In an embodiment, the mask 234 may be disposed on a mask stage of a lithography system and the semiconductor substrate is disposed on a wafer stage. The lithography operation may involve projection of a patterned exposure radiation onto the photoresist layer through transmission or reflection of the mask 234. Portions of the photoresist layer may be removed after the lithography operation.

The method 700 continues with step 708 to pattern the material layer using the patterned photoresist layer as an etch mask. Next, the photoresist layer is removed. The removal operations may include an etching or ashing operation. As a result, the lithography operation transfers the shape of the feature of the mask to the material layer.

Figure 8:
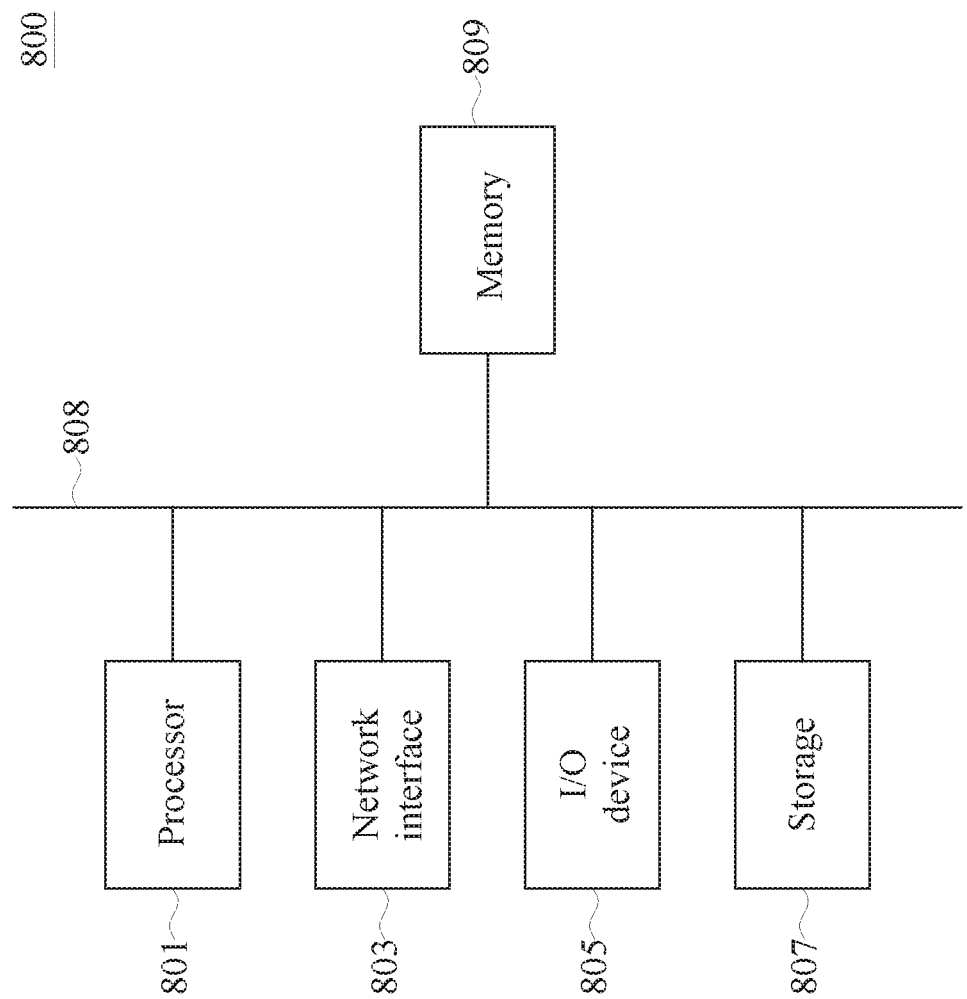
FIG. 8 is a schematic diagram of a system implementing a lithography method, in accordance with some embodiments.

FIG. 8 is a schematic diagram of a system 800 implementing the lithography methods discussed above, in accordance with some embodiments.

The system 800 includes a processor 801, a network interface 803, an input and output (I/O) device 805, a storage device 807, a memory 809, and a bus 808. The bus 808 couples the network interface 803, the I/O device 805, the storage device 807, the memory 809 and the processor 801 to each other.

The processor 801 is configured to execute program instructions that include a tool configured to perform the method as described and illustrated with reference to figures of the present disclosure. Accordingly, the tool is configured to execute steps, such as providing design specifications, generating design layout data, performing LOP checks, performing OPC operations, performing LPC operations, and performing layout peripheral adjustments.

The network interface 803 is configured to access program instructions and data accessed by the program instructions stored remotely through a network (not shown).

The I/O device 805 includes an input device and an output device configured for enabling user interaction with the system 800. In some embodiments, the input device comprises, for example, a keyboard, a mouse, and other devices. Moreover, the output device comprises, for example, a display, a printer, and other devices.

The storage device 807 is configured for storing program instructions and data accessed by the program instructions. In some embodiments, the storage device 807 comprises a non-transitory computer-readable storage medium, for example, a magnetic disk and an optical disk.

The memory 809 is configured to store program instructions to be executed by the processor 801 and data accessed by the program instructions. In some embodiments, the memory 809 comprises any combination of a random access memory (RAM), some other volatile storage device, a read-only memory (ROM), and some other non-volatile storage device.

According to an embodiment, a method includes: receiving a design layout including a feature in a peripheral region of the design layout; determining a first compensation value associated with the peripheral region according to an exposure distribution in an exposure field of a workpiece; and adjusting the design layout by modifying a shape of the feature according to the compensation value.

According to an embodiment, a non-transitory computer-readable storage medium is disclosed, wherein the non-transitory computer-readable storage medium includes instructions which, when executed by a processor, perform the steps of: receiving a design layout including a feature in a peripheral region of the design layout; determining a first compensation value associated with the peripheral region according to a reflectivity of a pellicle assembly, the pellicle assembly being disposed over a mask manufactured according to the design layout; and adjusting the design layout by modifying a shape of the feature according to the first compensation value.

According to an embodiment, a system is disclosed, wherein the system includes a processor and one or more programs including instructions which, when executed by the processor, cause the system to: receive a design layout comprising a feature in a peripheral region of the design layout; determine a compensation value associated with the peripheral region according to an exposure distribution in an exposure field of a workpiece; adjust the design layout by modifying a shape of the feature according to the compensation value; and perform a lithography operation that transfers the shape of the feature to the workpiece.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    receiving a design layout comprising a feature in a peripheral region of the design layout;
    performing model-based optical proximity correction on the design layout by dissecting edges of the feature by dissection lines;
    determining compensation values associated with a pellicle assembly and the peripheral region according to an exposure distribution in an exposure field of a workpiece;
    adjusting the design layout by modifying a shape of the feature according to the compensation values; and
    manufacturing a mask according to the design layout,
    wherein the modifying of the shape of the feature according to the compensation values comprises:
        partitioning the peripheral region into compensation zones, wherein the feature comprises portions disposed within the respective compensation zones;
        assigning the compensation values to the respective compensation zones; and
        reducing line widths of the portions of the feature according to the compensation values associated with the respective compensation zones.

2. The method according to claim 1, further comprising manufacturing a semiconductor device according to the mask.

3. The method according to claim 1, wherein the determining of the compensation values is performed further according to a reflectivity of the pellicle assembly disposed over the mask.

4. The method according to claim 1, further comprising performing a ruled-based optical proximity correction on the design layout.

5. The method according to claim 1, wherein each of the compensation values is represented as a ratio, and wherein the reducing of the line widths of the portions of the feature comprises reducing the line widths by the ratio of each of the line widths.

6. The method according to claim 1, wherein the modifying of the shape of the feature according to the compensation values comprises causing the feature partially compensated.

7. The method according to claim 1, wherein each of the compensation zones has a polygonal shape.

8. The method according to claim 1, wherein the compensation values are determined according to a distance between the feature and a side of the design layout.

9. The method according to 1, wherein assigning compensation values to the respective compensation zones comprises assigning a first compensation value associated with a first compensation zone and a second compensation value associated with a second compensation zone, the second compensation value being less than the first compensation value and the first compensation zone being closer to a side of the design layout than the second compensation zone.

10. The method according to claim 1, wherein a side of each of the portions is defined by two adjacent dissection lines, and the side is parallel to and offset from a boundary of each of the compensation zones.

11. A non-transitory computer-readable storage medium, comprising instructions which, when executed by a processor, perform the steps of:
    receiving a design layout comprising a feature in a peripheral region of the design layout;
    performing model-based optical proximity correction on the design layout;
    determining compensation values associated with the peripheral region according to a reflectivity of a pellicle assembly, the pellicle assembly being disposed over a mask;
    adjusting the design layout by modifying a shape of the feature according to the compensation values through the steps of:
        partitioning the peripheral region into compensation zones, wherein the feature comprises portions disposed within the respective compensation zones;
        assigning the compensation values to the respective compensation zones; and
        reducing line widths of the portions of the feature according to the compensation values associated with the respective compensation zones; and
    causing the mask to be manufactured according to the design layout.

12. The non-transitory computer-readable storage medium according to claim 11,
    wherein the partitioning of the peripheral region comprises partitioning the peripheral region into a corner region and a side region, wherein the compensation zones comprise a first portion and a second portion disposed in the corner region and the side region, respectively,
    wherein the assigning of the compensation values comprises assigning a first compensation value and a second compensation value to the corner region and the side region, respectively,
    wherein the reducing of the line widths of the portions of the feature comprises reducing line widths of both the first portion and the second portion according to the first and second compensation values, respectively.

13. The non-transitory computer-readable storage medium according to claim 12, wherein the peripheral region comprises a first compensation zone having an L shape.

14. The non-transitory computer-readable storage medium according to claim 12, wherein the instructions further perform the step of performing a retargeting operation subsequent to adjusting the design layout.

15. The non-transitory computer-readable storage medium according to claim 11, wherein the instructions further perform the step of:
    adding a sub-resolution feature to the design layout; and
    preventing the sub-resolution feature from being subjected to the step of adjusting the design layout.

16. A system, comprising a processor and one or more programs including instructions which, when executed by the processor, cause the system to:
- receive a design layout comprising a feature in a peripheral region of the design layout;
- performing model-based optical proximity correction on the design layout;
- determine compensation values associated with a pellicle assembly and the peripheral region according to an exposure distribution in an exposure field of a workpiece;
- adjust the design layout by modifying a shape of the feature according to the compensation values through the steps of:
  - partitioning the peripheral region into compensation zones, wherein the feature comprises portions disposed within the respective compensation zones;
  - assigning the compensation values to the respective compensation zones; and
  - reducing line widths of the portions of the feature according to the compensation values associated with the respective compensation zones; and
- perform a lithography operation that transfers the shape of the feature to the workpiece.

17. The system according to claim 16, wherein the instructions, when executed by the processor, further cause the system to add a sub-resolution feature to the design layout and modify a shape of the sub-resolution feature according to the compensation values.

18. The system according to claim 16, wherein the compensation values is determined according to a distance between the feature and a vertex of the design layout.

19. The system according to claim 16, further comprising manufacturing a mask according to the design layout, wherein the lithography operation is performed according to the mask.

20. The system according to claim 16, wherein the partitioning of the peripheral region into the compensation zones comprises dissecting edges of the feature into edge segments, wherein the portions are determined according to the edge segments.

* * * * *